United States Patent [19]

Meredith

[11] Patent Number: 5,255,284
[45] Date of Patent: Oct. 19, 1993

[54] ANODE FOR AN ELECTIC ARC FURNACE UTILIZING ELECTRODE SEGMENTS

[75] Inventor: Dane Meredith, Brandon, Fla.

[73] Assignee: Deutsch Voest-Alpine Industrieanlagenbau GmbH, Dusseldorf, Fed. Rep. of Germany

[21] Appl. No.: 787,059

[22] Filed: Nov. 4, 1991

[51] Int. Cl.⁵ ............................................... F27D 1/00
[52] U.S. Cl. ......................................... 373/72; 373/60
[58] Field of Search ........................... 373/60, 71, 72; 432/252

[56] References Cited

U.S. PATENT DOCUMENTS

| | | | |
|---|---|---|---|
| 941,419 | 11/1909 | Keller | 373/72 |
| 3,190,626 | 6/1965 | Schwabe et al. | 373/71 |
| 4,829,538 | 5/1989 | Hlawatschek et al. | 373/72 |
| 5,142,650 | 8/1992 | Kida et al. | 373/88 |

FOREIGN PATENT DOCUMENTS

| | | | |
|---|---|---|---|
| 0058817 | 1/1982 | European Pat. Off. | |
| 741244 | 11/1943 | Fed. Rep. of Germany | 373/71 |
| 3413745 | 10/1984 | Fed. Rep. of Germany | |
| 1014772 | 8/1952 | France | 373/71 |
| 2042309 | 9/1980 | United Kingdom | 373/72 |

Primary Examiner—Bruce A. Reynolds
Assistant Examiner—John A. Jeffrey
Attorney, Agent, or Firm—Locke Reynolds

[57] ABSTRACT

A direct-current electric arc furnace has an at least one electric arc electrode switched as a cathode and a bottom electrode switched as an anode. The bottom electrode includes an electrically conductive bottom plate, a first ramming mass consisting of electrically non-conducting refractory material centrally located atop the electrically conductive bottom plate, and a second ramming mass consisting of electrically non-conducting refractory material, the second ramming mass being located atop and about a periphery of the electrically conductive bottom plate.

A plurality of concentrically arranged electrode segments are positioned between the first and second ramming masses, each of the plurality of electrode segments including an electrically non-conducting ramming mass configured to support a plurality of vertically arranged and electrically conducting segment conductors. Each of the segment conductors is formed from metal sheeting and electrically connected to the electrically conductive bottom plate to present a low cross sectional area upper frontal face to contact a melt contained in the furnace. The sheeting can be configured as substantially flat sheets, or can be curved to form partial or complete circular pipes.

25 Claims, 2 Drawing Sheets

ANODE FOR AN ELECTIC ARC FURNACE UTILIZING ELECTRODE SEGMENTS

The invention relates to a direct current electric arc furnace having at least one centered electric arc electrode switched as cathode and a bottom electrode switched as anode and connected with a busbar arrangement. The furnace includes a bottom lining consisting, at least for the preponderant part, of an electrically non-conducting ramming mass into which electrically conducting metal parts in the form of sheet metal inserts, pins or rods are introduced, the upper front faces of which are in conducting contact with the melt.

From DE-OS 34 13 745 a direct-current electric arc furnace has been known in which the bottom lining is made in the form of a multi-layer build-up. Therein, the bottom lining at its face of contact with the melt consists of a ramming mass into which electrically conducting metal parts in the form of rods or sheets are included thus making up the upper bottom of the furnace vessel. Such layer may also consist of bricks with sheet-metal intermediate layers or sheet-metal linings which is followed by a layer of electrically conducting bricks. The next following layer is a layer consisting of electrically conducting bricks which may consist of magnesite-graphite. Joining this layer toward the vessel bottom is a layer which consists alternatingly of electrically conducting bricks and insulating bricks. The following final layer is again a layer of electrically conducting bricks to which the connecting contacts are joined. In an embodiment of such a direct-current electric arc furnace, the bottom contact part contains a prefabricated cylindrical sheet-metal mould the bottom of which is provided with vertically disposed current-conducting sheets rods or pins welded thereto.

The very well known problem occurring in such a furnace which must be solved, is the contradiction between the required heat insulation, heat removal and the likewise indispensable electrical conductivity for producing the electric arc by the combination and defined arrangement of heat-insulating layers and electrically conducting areas. This problem requires much effort in the construction of such a direct-current electric arc furnace since the various materials in the respective layers must be arranged in a certain way so that the desired purpose will be achieved. In case of the above mentioned anode structure, a new layer must be applied after the considerable wear of the uppermost stratum or layer interspersed with metallic conductors after a relatively short operating period implying respectively short service lifes.

From EP 0 058 817, a contact electrode arrangement for electric-arc or resistance melting furnaces has been known in which the electrode studs have been fastened electrically conductingly on a base plate disposed outside of the furnace lining. Said electrodes run through the lining and are in direct contact with the melt. This arrangement has the disadvantage that an extensive cooling arrangement including its monitoring must be provided on account of the high heat dissipation through the electrode rods and the current concentration on a relatively small area. The high electric conductivity and therewith the corresponding good heat conductivity create there considerable problems in view of the necessary heat removal. Furthermore, the electrode heads are present in the area directly below the upper electrode where they are subject to increased wear due to the action of the electric arc and the turbulent molten bath movement.

The fact that the electrodes are in the center of the furnace bottom creates further considerable disadvantages in addition to the unfavorable cooling conditions. So there is an increased danger in case of a breakthrough of the hearth or also because lead present in the melting stock may penetrate through the gaps in the lining or between the lining and the electrodes due to its high specific weight and its low viscosity at the prevailing high temperatures, producing damage in the insulation area of the furnace.

There the invention sets in, the object of which is to form the bottom electrode in a direct-current electric arc furnace in such a manner that a low-wear operation with only little cooling and with other improved operating conditions is possible and which is easily adaptable to various embodiments of direct-current electric arc furnaces, i.e. which may be produced economically with little assembly work.

The object of the invention is achieved with a direct current electric arc furnace having at least one centered electric arc electrode switched as cathode and a bottom electrode switched as anode and connected with a busbar arrangement. The furnace includes a bottom lining consisting, at least for the preponderant part, of an electrically non-conducting ramming mass into which electrically conducting metal parts in the form of sheet metal inserts, pins or rods are introduced, the upper front faces of which are in conducting contact with the melt. The furnace also includes a plurality of electrode segments disposed in a vertical position on an electrical feed line made in the form of a bottom plate in direct area contact with same, the totality of which make up an electrode ring, so that on each electrode segment a plurality of segment conductors with low cross sectional areas run in an upward direction through the ramming mass. The segment conductors can include electrically conducting metal parts fastened in radial arrangement, with their lower front areas of being connected each to the respective electrode segment and their upper free front faces placed in contact with the melt within the furnace vessel.

The monolithic ramming mass completely fills at least the area of the electrode segments above the bottom plate up to the front faces of the segment conductors, so that the electric current is conducted from the busbar arrangement to the copper ring at a lower vessel outer wall, and from there through the bottom plate to the electrode segments. In preferred embodiments of the direct-current electric arc furnace of the present invention, an addition in the segment-free bottom center and the radially outer area between the ring of electrode segments and the vessel wall consists likewise of ramming mass.

In other preferred embodiments, the furnace has a lining in the radially outer area consisting of a lining of electrically non-conducting bricks, or may be formed so that the cross sectional area of the front faces of the segment conductors in electrically conducting contact with the melt is constant to result in a uniform distribution.

Alternatively, the cross sectional area of the front faces of the segment conductors in electrically conducting contact with the melt may increase in radially outward direction. Similarly, the distances of the segment conductors may increase in radially outward direction, or the distances of the segment conductors may remain constant in a radially outward direction.

In addition to the foregoing, further advantageous embodiments and developments are described as follows.

Due to the bottom plate serving as electric conductor on which a number of electrode segments is placed in direct area contact, said segments being preferably disposed in the form of a ring, and on which are fastened to the conductors running in the electrically non-conductive ramming mass, that part of the electrode switched as anode and consisting of prefabricated elements may very easily be assembled during construction of the furnace hearth. The ramming mass is subsequently filled-in in a manner as such known, and the gaps between the various conductors are filled with no predetermined layer build-up being required. No endangering of the insulation area by the lead present in the melt can occur because the insulation is located in the lateral vessel wall.

The various electrode segments may be shaped uniformly and produce, in connection with the other current-conducting parts such as the lateral busbars and the copper ring resting against the inner vessel wall of the lower vessel produce a uniform field of electrical current distribution. Due to the varied shaping of the electrode segments and their specified placement, the formation of the magnetic field may be controlled with a view to deflecting the electric arc or to compensating actual deflections.

Segment conductors may be shaped in the form of sheets, rods, pipes or semi-cylindrical pipes, the two latter forms having a higher stability rendering thus superfluous the use of spacers for keeping a pre-defined distance of the various segment conductors.

In addition to the various shaping of the segment conductors, control may be exercised by a differing local shaping of the cross sectional areas of the segment elements which are in direct contact with the melt. In this respect, there are many possibilities given such as varying the distances of the various segment conductors in radial direction and the disposition of the various segment elements keeping a constant distance in that direction and increasing the cross sectional areas of the sectional planes being in contact with the melt due to the greater lengthwise extension of the outer segment elements. In case of pipe-shaped or semi-cylindrical-pipe-shaped segment conductors, their diameter may be increased in radially outward direction.

The individual electrode segments may be fastened to the bottom plate disposed in the form of a closed circular ring or with gaps between them, and may even asymmetrically be disposed for obtaining a specified control of the magnetic field.

The segment conductors on the various individual electrode elements may be arranged in parallel rows or in the form of segments of a circular ring. The shape of the basic area of the electrode segments should preferably be trapezoidal or in the shape of a circular ring segment. In case of circular ring segments, however, no segment conductors should be fastened on the pointed area extending toward the center of the furnace when assembled, in order to take account of the wear increasing action of the electric arc and the turbulent melt movements in that area. Trapezoidal electrode segments forming an electrode ring have there a free area anyway.

Especially favorable is the use of such variation possibilities for controlling the pool temperature in the area of the eccentric furnace tap by a specified deflection of the electric arc in that direction.

Due to the heat delivery through the segment conductors into the ramming mass in the lower area and the reduced heat transfer from the melt to the vessel bottom and the low current load on the elements, an additional cooling may be dispensed with under certain circumstances. Should a cooling device nevertheless be necessary, it may be smaller dimensioned and may preferably and very advantageously be located underneath the furnace shell center in form of an air cooling system.

Because the direct-current electric arc furnace consists of a lower vessel and an upper vessel, the assembly may additionally be simplified by replacing the lower part with an already pre-assembled second lower vessel reducing thus the idle time of the furnace.

In the following, the invention will be further explained taking reference to an embodiment thereof.

Figure 1:
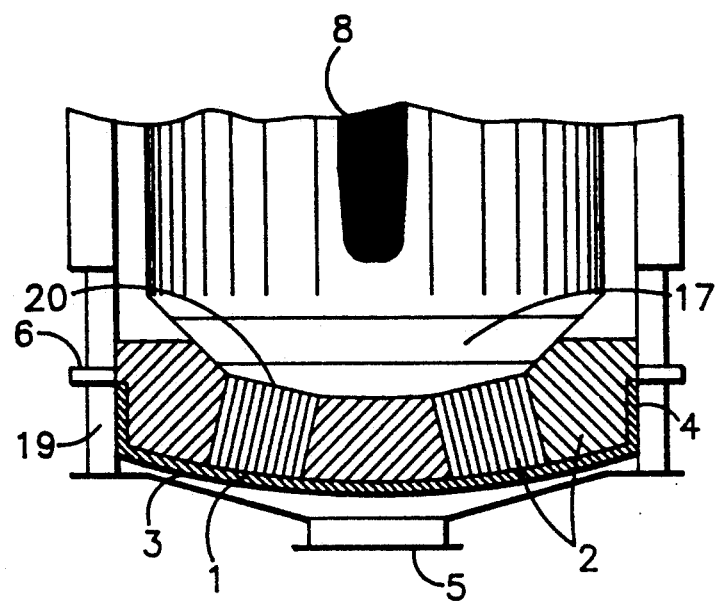
FIG. 1 is a cross sectional representation of a side view of a direct-current electric arc furnace.

In a certain embodiment of the invention as represented by FIG. 1 it is recognizable that electrode segments 1 are fastened to a bottom plate 3 which is cup shaped or plane shape. Segment conductors 12 are welded to the electrode segments 1 in parallel arrangement. The hearth lining of the direct-current electric arc furnace consists of an electrically non-conducting ramming mass 2 which fills also the gaps between the segment conductors 12 to an extent that the upper frontal areas 20 are just in touch with the pool 17. Also the segment-free bottom center 18 and the radially outer area of the addition 21 consist of ramming mass 2. The direct-current electric arc furnace consists of a lower vessel and an upper vessel, the respective vessel wall 19 being recognizable in the figure.

The electrode segments 1 are disposed so that no segment conductors 12 are present in the area of the segment-free bottom center 18 of the cathode 8 being made in the form of a movable upper electrode.

Figure 2:
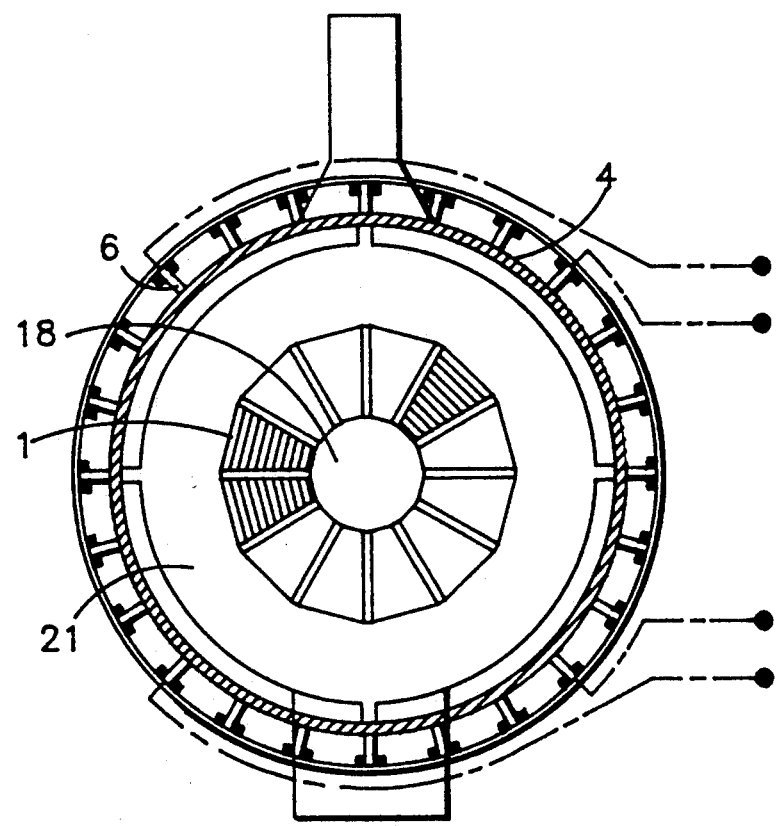
FIG. 2 shows the respective cross sectional representation of the top view.

The bottom plate 3 is in direct electric contact with the copper ring 4 resting against the vessel wall 19 of the lower vessel, being likewise enclosed at the inside by the non-conducting ramming mass 2, such copper ring being in turn connected with the laterally disposed busbars 6, as can be seen in FIG. 2, so that the electric current will flow through such elements to the segment conductors 12 to establish an electric arc. Therefrom results an additional positive effect because there are no current conducting parts underneath the furnace which would be endangered in particular in case of a bottom break out, and such space can be used for the supply of cooling air 5.

In the top view of a direct-current electric arc furnace represented in FIG. 2, the ring-shaped arrangement, in the case under consideration, of twelve electrode segments 1 around the center of the furnace is recognizable since the upper electrode 8, not visible in this representation, is located centrically above the molten bath 17 in such furnace. The direct area of action of the electric arc, which is exposed in a particular manner to the wear of the hearth, is favorably kept free of segment conductors 12 with this shape and formation of the electrode segments 1. In the above representation, segment conductors 12 in parallel row disposition are shown on three electrode segments 1 only, it goes without saying that respective segment conductors 12 are also present on the other nine electrode segments 1.

Figure 3:
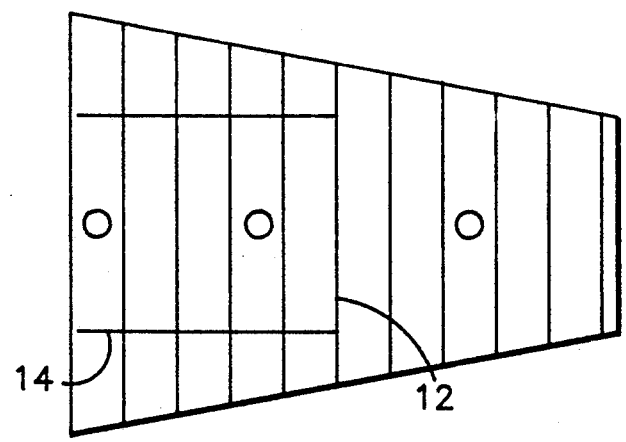
FIG. 3 shows a trapezoidal electrode segment.

In case of the electrode segment in accordance with FIG. 3, segment conductors 12 are vertically welded on a foot plate in rows in parallel disposition. In order to fix in particular the longer segment conductors 12 in a pre-defined distance with respect to one another, spacers 14 are fastened to same between neighboring segment conductors each, so that they cannot be displaced when the ramming mass 2 is filled in. Such spacers 14 may likewise be of steel and can be fastened to the segment conductors 12 so that they jut out into the pool 17 and are forming additional conductors.

Figure 4:
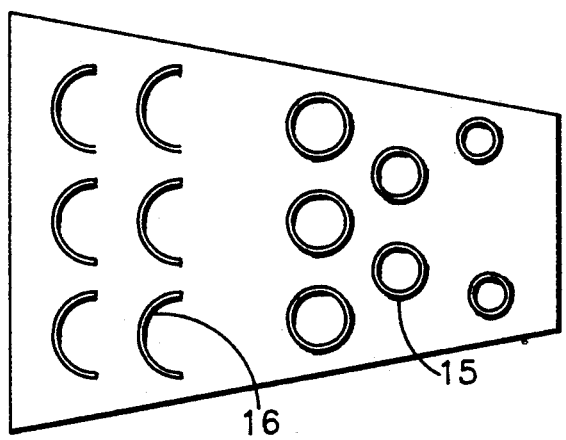
FIG. 4 shows an electrode segment with differently shaped segment conductors.

Two shapes of segment conductors 15 and 16 are shown on the electrode segment 1 represented in FIG. 4. The segment conductors 16 are U-shaped (semi-cylindrical pipes) and are fastened with one front face on the foot plate 11.

The segment conductors 15 being fastened to the electrode segment 1, are pipe shaped.

In case of segment conductors 16 and 15 the fixation can mostly be dispensed with, since this shaping engenders a sufficient stability. As opposed to segment conductors 12, both shapes have further advantages because the cross sectional areas coming into contact with the pool are variable in a most simple manner due to the different radius.

In order to safeguard a propitious heat transition behavior of the segment conductors 12, 16 and 15, the wall thickness should be not more than 5 mm.

Figure 5:
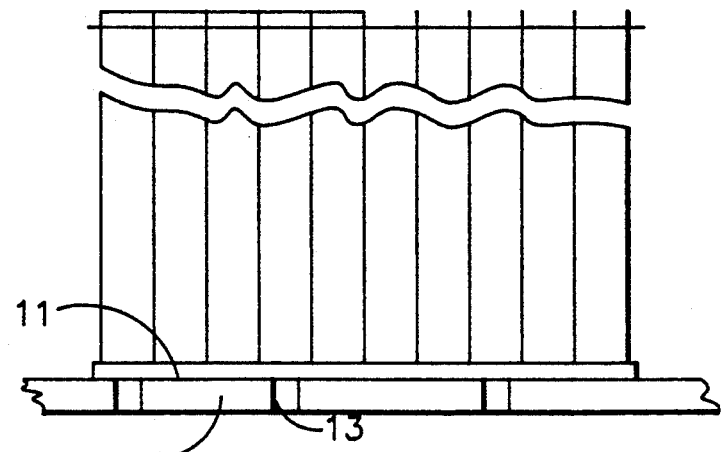
FIG. 5 shows a side view of a mounted electrode segment.

FIG. 5 shows a side view of an electrode segment 1 which disposes of segment conductors 12 which are welded vertically on the foot plate 11. The foot plate is additionally fastened to the lower hearth bottom by means of fastening means 13. In this connection is it especially favorable if such fastening means are electrically insulated against the hearth bottom.

What is claimed is:

1. A direct-current electric arc furnace having an at least one electric arc electrode switched as a cathode and a bottom electrode switched as an anode, the bottom electrode comprising
    an electrically conductive bottom plate,
    a plurality of concentrically arranged electrode segments, each of said plurality of electrode segments comprising an electrically non-conducting ramming mass configured to support a plurality of vertically arranged and electrically conducting segment conductors, with each of the segment conductors configured to form at least a portion of a pipe, the pipe-shaped segment conductor being electrically connected to the electrically conductive bottom plate to present a low cross sectional area upper frontal face to contact a melt contained in the furnace.

2. A direct-current electric arc furnace having an at least one electric arc electrode switched as a cathode and a bottom electrode switched as an anode, the bottom electrode comprising
    an electrically conductive bottom plate,
    a first ramming mass consisting of electrically non-conducting refractory material centrally located atop the electrically conductive bottom plate,
    a second ramming mass consisting of electrically non-conducting refractory material, the second ramming mass being located atop and about a periphery of the electrically conductive bottom plate,
    a plurality of concentrically arranged electrode segments positioned between said first and second ramming masses, each of said plurality of electrode segments comprising an electrically non-conducting ramming mass configured to support a plurality of vertically arranged and electrically conducting segment conductors, with each of the segment conductors formed from metal sheeting and electrically connected to the electrically conductive bottom plate to present a low cross sectional area upper frontal face to contact a melt contained in the furnace.

3. Direct-current electric arc furnace with an at least one electric arc electrode switched as cathode and with a bottom electrode switched as anode connected with a busbar arrangement, in which the bottom lining consists, at least for the preponderant part, of an electrically non-conducting ramming mass into which electrically conducting metal parts are introduced, the upper front faces of said electrically conducting metal parts being positionable in conducting contact with the melt, wherein a plurality of electrode segments (1) are disposed in vertical position on the electrical feed line made in the form of a bottom plate in direct area contact with same, the totality of which make up an electrode ring, that on each electrode segment (1), said electrically conducting metal parts comprise a plurality of segment conductors (12) with low cross sectional areas running in an upward direction through the said ramming mass (2), said segment conductors being fastened in radial arrangement, and the lower front areas of said segment conductors being connected each to the respective electrode segment and the upper free front faces (20) of the segment conductors being positioned to contact a melt (17) within the said furnace vessel, with the monolithic ramming mass (2) filling completely at least the area of the electrode segments (1) above the bottom plate (3) up to the front faces (20) of the segment conductors (12), and with the electric current being conducted from the busbar arrangement (6) to the copper ring (4) at a lower vessel outer wall (19) and from there through the bottom plate (3) to the electrode segments (1).

4. Direct-current electric arc furnace according to claim 1, wherein the addition in the segment-free bottom center (18) and the radially outer area (21) between the ring of electrode segments (1) and the vessel wall (19) further comprises a ramming mass (2).

5. Direct-current electric arc furnace according to claim 1, wherein the lining in the radially outer area (21) comprises a lining of electrically non-conducting bricks.

6. Direct-current electric arc furnace according to claim 1, wherein the cross sectional area of the front faces (20) of the segment conductors (12) positioned in electrically conducting contact with the melt (17) is constant to provide a uniform distribution.

7. Direct-current electric arc furnace according to claim 1, wherein the cross sectional area of the front faces (20) of the segment conductors (12) positioned in electrically conducting contact with the melt (17) increases in radially outward direction.

8. Direct-current electric arc furnace according to claim 1, wherein the distances of the segment conductors (12) increase in radially outward direction.

9. Direct-current electric arc furnace according to claim 1, wherein the distances of the segment conductors (12) in radially outward direction are constant.

10. Direct-current electric arc furnace according to claim 1, wherein the said segment conductors (12) consist of sheets.

11. Direct-current electric arc furnace according to claim 1, wherein the said sheets forming the segment conductors are curved.

12. Direct-current electric arc furnace according to claim 1, wherein the said segment conductors (15) are pipe shaped.

13. Direct-current electric arc furnace according to claim 12, wherein the said segment conductors (16) are semi-cylindrically-pipe shaped.

14. Direct-current electric arc furnace according to claim 13, wherein at least one of said pipe-shaped and semi-cylindrical-pipe-shaped segment conductors (15, 16) are fastened with one of their respective circular and semi-circular front faces upon a foot plate (11) of the electrode segments (1).

15. Direct-current electric arc furnace according to claim 13 wherein at least one of the number and the diameters of the pipe-shaped or semi-cylindrical-pipe-shaped segment conductors (15, 16) decrease in radially inward direction.

16. Direct-current electric arc furnace according to claim 1, wherein spacers (14) are fastened to and between the segment conductors (12).

17. Direct-current electric arc furnace according to claim 1 wherein the electrode segments (1) have a trapezoidal shape.

18. Direct-current electric arc furnace according to claim 1 wherein the electrode segments (1) have a base area in the shape of circular segments.

19. Direct-current electric arc furnace according to claim 1 wherein the segment conductors (12, 15, 16) are uniformly distributed on the various electrode segments (1).

20. Direct-current electric arc furnace according to claim 1 wherein the segment conductors (12, 15, 16) are non-uniformly distributed on the various electrode segments (1).

21. Direct-current electric arc furnace according to claim 1 wherein at least one of the number and the cross sectional area of the front faces (20) of the segment conductors (12, 15, 16) positioned in contact with the pool (17) in the area of an eccentric furnace tap differ with respect to other areas of the electrode segments (1).

22. Direct-current electric arc furnace according to claim 1 wherein a cooling air supply (5) is directed to a central lower furnace area.

23. Direct-current electric arc furnace according to claim 1 wherein the said direct-current electric arc furnace is composed of a lower vessel configured to accommodate the anode and an upper vessel set upon the anode.

24. Direct-current electric arc furnace according to claim 1 wherein the said segment conductors (12, 15, 16) consist of metal substantially equivalent to a melting stock forming said melt.

25. Direct-current electric arc furnace according to claim 1 wherein insulation of the anode against the upper shell part is located in the shell walls.

* * * * *

UNITED STATES PATENT AND TRADEMARK OFFICE
CERTIFICATE OF CORRECTION

PATENT NO. : 5,255,284
DATED : October 19, 1993
INVENTOR(S) : Dane Meredith It is certified that error appears in the above-identified patent and that said Letters Patent is hereby corrected as shown below:

Title page, column 1, line 1, in the Title [54], please delete "ELECTIC" and insert therefor --ELECTRIC--;

At column 6, line 52, please delete "1" and insert therefor --3--;

At column 6, line 57, please delete "1" and insert therefor --3--;

At column 6, line 60, please delete "1" and insert therefor --3--;

At column 6, line 65, please delete "1" and insert therefor --3--;

At column 7, line 2, please delete "1" and insert therefor --3--;

At column 7, line 5, please delete "1" and insert therefor --3--;

At column 7, line 8, please delete "1" and insert therefor --3--;

At column 7, line 11, please delete "1" and insert therefor --3--;

At column 7, line 14, please delete "1" and insert therefor --3--;

At column 7, line 31, please delete "1" and insert therefor --3--;

UNITED STATES PATENT AND TRADEMARK OFFICE
CERTIFICATE OF CORRECTION

PATENT NO. : 5,255,284
DATED : October 19, 1993
INVENTOR(S) : Dane Meredith

It is certified that error appears in the above-identified patent and that said Letters Patent is hereby corrected as shown below:

At column 8, line 2, please delete "1" and insert therefor --3--;
At column 8, line 5, please delete "1" and insert therefor --3--;
At column 8, line 8, please delete "1" and insert therefor --3--;
At column 8, line 12, please delete "1" and insert therefor --3--;
At column 8, line 16, please delete "1" and insert therefor --3--;
At column 8, line 23, please delete "1" and insert therefor --3--;
At column 8, line 26, please delete "1" and insert therefor --3--;
At column 8, line 31, please delete "1" and insert therefor --3--; and
At column 8, line 35, please delete "1" and insert therefor --3--.

Signed and Sealed this

Seventeenth Day of May, 1994

BRUCE LEHMAN

Attest:

Attesting Officer

Commissioner of Patents and Trademarks